(12) United States Patent
Nakamura et al.

(10) Patent No.: US 6,836,291 B1
(45) Date of Patent: *Dec. 28, 2004

(54) IMAGE PICKUP DEVICE WITH INTEGRAL AMPLIFICATION

(75) Inventors: Satoshi Nakamura, Ikeda (JP); Kenji Takada, Itami (JP); Yoshio Hagihara, Amagasaki (JP); Shigehiro Miyatake, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/283,644

(22) Filed: Apr. 1, 1999

Related U.S. Application Data

(60) Provisional application No. 60/097,654, filed on Aug. 24, 1998.

(30) Foreign Application Priority Data

Apr. 30, 1998 (JP) .......................................... 10-120251

(51) Int. Cl.$^7$ ................................................ H04N 3/14
(52) U.S. Cl. ......................... 348/301; 348/302; 348/308
(58) Field of Search ................................ 348/294, 295, 348/297, 300, 301, 302, 303, 304, 308, 309, 307, 310; 257/288, 290, 291

(56) References Cited

U.S. PATENT DOCUMENTS

| | | | | |
|---|---|---|---|---|
| 5,241,575 A | * | 8/1993 | Miyatake et al. | 257/292 |
| 5,289,286 A | * | 2/1994 | Nakamura et al. | 257/292 |
| 5,335,008 A | * | 8/1994 | Hamasaki | 348/301 |
| 5,488,415 A | | 1/1996 | Uno | 348/241 |
| 5,576,761 A | * | 11/1996 | Iwamoto | 348/257 |
| 5,619,262 A | * | 4/1997 | Uno | 348/297 |
| 5,917,547 A | * | 6/1999 | Merrill et al. | 348/301 |
| 5,933,190 A | * | 8/1999 | Dierickx et al. | 348/308 |
| 6,011,251 A | | 1/2000 | Dierickx et al. | 250/208.1 |
| 6,054,704 A | | 4/2000 | Pritchard et al. | 250/208.1 |
| 6,111,242 A | | 8/2000 | Afghahi | 250/208.1 |
| 6,111,245 A | | 8/2000 | Wu et al. | 250/208.1 |
| 6,118,482 A | | 9/2000 | Clark et al. | 348/308 |
| 6,130,713 A | * | 10/2000 | Merrill | 348/308 |
| 6,201,572 B1 | | 3/2001 | Chou | 348/241 |
| 6,239,839 B1 | | 5/2001 | Matsunaga et al. | 348/308 |
| 6,355,965 B1 | | 3/2002 | He et al. | 257/431 |
| 6,512,544 B1 | | 1/2003 | Merrill et al. | 348/302 |
| 2001/0066402 | * | 7/2001 | Hosier et al. | 348/308 |
| 2002/0154231 A1 | * | 10/2002 | Decker et al. | |

FOREIGN PATENT DOCUMENTS

JP          3-192764          8/1991

* cited by examiner

Primary Examiner—Wendy R. Garber
Assistant Examiner—Jacqueline Wilson
(74) Attorney, Agent, or Firm—Sidley Austin Brown & Wood LLP

(57) ABSTRACT

A solid-state, two-dimensional image sensing device having a matrix of pixels each of which employs a photosensor that generates a photocurrent and a MOS circuit which outputs a signal proportional to the logarithm of the integral over time of the photocurrent. The sensor includes an integration control switching device so that all pixels in the array have equal integration time. The sensor integrates the signal for each pixel for a period of time and stores the integrated signal in a pixel signal storage location. To read out the stored signal each pixel includes an amplifier to increase the signal during read out. The sensor further accumulates signal in either a MOS transistor pn-junction or a secondary pixel storage location during a time that the integrated pixel signal is being read out so that image information can be collected continuously even while the integrated pixel signal for each pixel is being read.

35 Claims, 9 Drawing Sheets

IMAGE PICKUP DEVICE WITH INTEGRAL AMPLIFICATION

RELATED APPLICATIONS

This application is based on Japanese Patent Application No. 10-120251, the entire contents of which is incorporated herein by reference. This application claims the benefit of prior filed copending U.S. Provisional Application No. 60/097,654 filed Aug. 24, 1998.

FIELD OF THE INVENTION

The present invention relates to a solid-state image pickup device and, more particularly, to a solid-state image pickup device comprising pixels arranged in two dimensions.

BACKGROUND OF THE INVENTION

A two-dimensional solid-state image pickup device in which pixels each including a photoelectric converting element such as a photodiode and means for drawing out photoelectric charges generated in the photoelectric converting element onto an output signal line are arranged to form a matrix (with rows and columns) has had a wide variety of applications. Such solid-state image pickup devices can be subdivided into CCD types and MOS types depending on the means for reading out (drawing out) the photoelectric charges generated in the photoelectric converting element. A CCD image pickup device has the drawback of a narrow dynamic range due to the photoelectric charges which are transferred while being accumulated in potential wells. In a MOS image pickup device, on the other hand, charges accumulated in the pn junction capacitance of a photodiode are read out via a MOS transistor.

Referring to FIG. 24, the structure of each pixel in a conventional MOS solid-state image pickup device will be described. In the drawing, a photodiode PD has a cathode connected to the gate of a MOS transistor T1 and to the drain of a MOS transistor T2. The MOS transistor T1 has a source connected to the drain of a MOS transistor T3 which has a source connected to an output signal line Vout. A direct-current voltage VDD is applied to the drain of the MOS transistor T1, while a direct-current voltage Vss is applied to the source of the MOS transistor T2 and to the anode of the photodiode. A reset pulse $\Phi RS$ is applied to the gate of MOS transistor T2.

When the photodiode PD is irradiated with light, photoelectric charges are generated and accumulated in the gate of the MOS transistor T1. When the MOS transistor T3 is turned ON with the application of a pulse $\Phi V$ to the gate thereof, an electric current proportional to the charges in the gate of the MOS transistor T1 is led out onto the output signal line Vout through the MOS transistors T1 and T3, whereby an output current proportional to the quantity of incident light is read out. After the reading of a signal, the MOS transistor T3 is turned OFF to turn the MOS transistor T2 ON, which initializes the gate voltage of the MOS transistor T1.

Thus, in the conventional MOS solid-state image pickup device, the photoelectric charges generated in the photodiode and accumulated in the gate of the MOS transistor are read from each of the pixels without any alterations thereto so that the output signal has a narrow dynamic range and contains the variable component and noise component of light from the power source. Moreover, since the output signal is on a low level, the conventional MOS image pickup device is disadvantageous in that the S/N ratio is low and a high-quality image pickup signal cannot be obtained therefrom.

SUMMARY OF THE INVENTION

It is therefore an object of the present invention to provide a solid-state image pickup device capable of producing a high output from a pixel. Another object of the present invention is to provide a solid-state image pickup device capable of generating an image pickup signal with an excellent S/N ratio. Still another object of the present invention is to provide a solid-state image pickup device with a wide dynamic range.

These and other objects of the present invention are achieved by a two-dimensional solid-state image pickup device comprising pixels arranged to form a matrix, each of the pixels including: a photoelectric converting element; logarithmic converting means for changing an output current from the photoelectric converting element into a logarithmically converted voltage; a transistor having a first electrode, a second electrode, and a control electrode to which an output voltage from the logarithmic converting means is applied; a capacitor having one terminal for receiving an output current from the second electrode of the transistor; an amplifier for amplifying an output from the capacitor; and a lead-out path for leading out an amplified signal onto an output signal line.

In this arrangement, the output signal from the photoelectric converting means is integrated in the capacitor so that the variable component and high frequency noise of light from the light source contained in the output signal is absorbed in the capacitor and removed from the output signal. The output signal from the photoelectric converting means from which the variable component and high frequency noise have been removed is further amplified by the amplifier to have a sufficient magnitude and then outputted, resulting in an image pickup signal with excellent sensitivity.

Moreover, logarithmic compression conversion achieves a wider dynamic range in the solid-state image pickup device in the arrangement. Furthermore, since each pixel is provided with the photoelectric converting means, the capacitor, the amplifier, and the lead-out means, a signal can be read more stably and more accurately.

The amplifier may include: an amplifier transistor having a first electrode, a second electrode, and a control electrode to which the output from the capacitor is applied; and a load resistor connected to an output line leading to the second electrode of the amplifier transistor. The load resistor may be used in common by several pixels. Hence, the load resistors may be smaller in total number than the pixels. In the case of using the amplifier transistor, the lead-out path is appropriately connected to the second electrode of the amplifier transistor such that a signal is led out from the second electrode.

A transistor having a first electrode connected to the second electrode of the amplifier transistor, a second electrode connected to a direct-current voltage, and a control electrode connected to a direct-current voltage may be used as the load resistor. A MOS transistor may be used as the amplifier transistor. In the case of using an n-channel MOS transistor, the direct-current voltage applied to the first electrode of the amplifier transistor is properly set higher in potential than the direct-current voltage connected to the second electrode of the resistor transistor.

In the case of using a p-channel MOS transistor as the amplifier transistor, the direct-current voltage applied to the first electrode of the amplifier transistor is properly set lower in potential than the direct-current voltage connected to the second electrode of the resistor transistor. The lead-out path to be used may include a switch for sequentially selecting a specified one of all the pixels and leading out the amplified voltage from the selected pixel onto the output signal line. The provision of a second capacitor for performing the subsequent integration while the output from the first capacitor is led out enables integration in the second capacitor simultaneously with the reading of the signal from the first capacitor and thereby provides compatibility with the shooting of a dynamic picture.

Additionally, a current input path to the capacitor may be provided with a switch to be controlled simultaneously in each of the pixels such that an integration time in each of the pixels is equal. In this case, there is no time lag between the reading of charges accumulated in the capacitors in one column and the reading of charges accumulated in the capacitors in another column so that the integration time in the capacitor (as well as the timing for integration) is equal in each of the pixels. Consequently, signals are free from any error due to a time lag between the reading of the signal from one pixel and the reading of the signal from another pixel.

These and other objects of the present invention may also be achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode connected to a direct-current voltage, the second MOS transistor operating in the subthreshold region; a capacitor having one terminal connected to a second electrode of the second MOS transistor and the other terminal connected to a direct-current voltage, the capacitor integrating a signal based on photoelectric charges generated in the photodiode; a third MOS transistor having a gate electrode connected to the one terminal of the capacitor and a first electrode connected to a direct-current voltage, the third MOS transistor operating as an amplifier; a fourth MOS transistor having a first electrode connected to the one terminal of the capacitor and a second electrode connected to a direct-current voltage, the fourth MOS transistor being turned ON in response to a reset signal inputted to a gate electrode thereof to reset the capacitor to an initial state; and a fifth MOS transistor for selecting a read operation having a first electrode connected to a second electrode of the third MOS transistor, a second electrode connected to an output signal line, and a gate electrode connected to a column select line.

In this arrangement, the photoelectric current generated in the photodiode is logarithmically converted in the first MOS transistor so that the gate voltage of the first MOS transistor becomes proportional to the current through the logarithmic conversion. The capacitor is charged with the voltage through the second MOS transistor. At the completion of integration, the fifth MOS transistor is turned ON and the charge on the capacitor is amplified by the third MOS transistor and led out onto the output signal line. When the reset pulse is applied to the gate of the fourth MOS transistor afterward, the capacitor is initialized so that the integration in the capacitor is initiated again.

These and other objects of the present invention may also be achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor, the second MOS transistor operating in the subthreshold region; a capacitor having one terminal connected to a second electrode of the second MOS transistor and the other terminal connected to a direct-current voltage, the capacitor being reset via the second MOS transistor when a reset voltage is applied to a first electrode of the second MOS transistor; a third MOS transistor having a gate electrode connected to the one terminal of the capacitor and a first electrode connected to a direct-current voltage, the third MOS transistor operating as an amplifier; and a fifth MOS transistor for selecting a read operation having a first electrode connected to a second electrode of the third MOS transistor, a second electrode connected to an output signal line, and a gate electrode connected to a column select line.

In this arrangement, the integration in the capacitor and the reading of the voltage from the capacitor are performed similarly to the previously described cases; however, the resetting of the capacitor is performed by releasing the charges from the capacitor through the second MOS transistor when the reset voltage is applied to the first electrode of the second MOS transistor.

These and other objects of the present invention may also be achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode connected to a direct-current voltage, the second MOS transistor operating in the subthreshold region; a capacitor having one terminal connected to a second electrode of the second MOS transistor and the other terminal connected to a direct-current voltage, the capacitor integrating a signal based on photoelectric charges generated in the photodiode; a third MOS transistor having a gate electrode connected to the one terminal of the capacitor and a first electrode connected to a direct-current voltage, the third MOS transistor operating as an amplifier; a fourth MOS transistor having a first electrode connected to the one terminal of the capacitor and a second electrode connected to a direct-current voltage, the fourth MOS transistor being constantly in the ON state with a direct-current voltage applied to a gate electrode thereof; and a fifth MOS transistor for performing a read operation having a first electrode connected to a second electrode of the third MOS transistor, a second electrode connected to an output signal line, and a gate electrode connected to a column select line.

In this arrangement, the fourth MOS transistor, which is constantly in the ON state, becomes equivalent to a resistor having a specified value which is connected to the capacitor. Accordingly, the initial value of the capacitor is determined by the resistor. In other words, the initial value can be adjusted by varying the direct-current voltage applied to the gate electrode of the fourth MOS transistor.

These and other objects of the present invention may also be achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode connected to a direct-current voltage, the second MOS transistor operating in the subthreshold region; a sixth MOS transistor having a first electrode connected to a second electrode of the second MOS transistor and a gate electrode to which a switching voltage is applied; a capacitor having one terminal connected to a second electrode of the sixth MOS transistor and the other terminal connected to a direct-current voltage, the capacitor integrating a signal based on a photoelectric current generated in the photodiode; a third MOS transistor having a gate electrode connected to the one terminal of the capacitor and a first electrode connected to a direct-current voltage, the third MOS transistor operating as an amplifier; a fourth MOS transistor having a first electrode connected to the one terminal of the capacitor and a second electrode connected to a direct-current voltage, the fourth MOS transistor being turned ON in response to a reset signal inputted to a gate electrode thereof to reset the capacitor to an initial state; and a fifth MOS transistor for performing a read operation having a first electrode connected to a second electrode of the third MOS transistor, a second electrode connected to an output signal line, and a gate electrode connected to a column select line, wherein the signal based on charges accumulated in the capacitor is amplified by the third MOS transistor and read out after integration in the capacitor is halted by turning OFF the sixth MOS transistor.

In this arrangement, the integration time in each of the pixels is equalized by simultaneously controlling the sixth MOS transistor of each of the pixels.

These and other objects of the present invention may also be achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode to which a clock is applied, the second MOS transistor operating in the subthreshold region; a capacitor having one terminal connected to a second electrode of the second MOS transistor via a first switch and the other terminal connected to a direct-current voltage, the capacitor integrating a signal based on a photoelectric current generated in the photodiode; a third MOS transistor having a gate electrode connected to the one terminal of the capacitor and a first electrode connected to a direct-current voltage, the third MOS transistor operating as an amplifier; and a second switch having one terminal connected to a second electrode of the third MOS transistor and the other terminal connected to an output signal line, wherein the first switch is turned ON to supply an output current from the second MOS transistor to the capacitor and thereby integrate the signal, the second switch is turned ON after the first switch is turned OFF to amplify the signal from the capacitor by means of the third MOS transistor and lead out the signal at the amplified voltage onto the output signal line, and then the first switch is turned ON, and the second switch is turned OFF, to initialize the capacitor through the second MOS transistor and the first switch during the period during which the clock applied to the first electrode of the second MOS transistor is at a reset voltage.

In this arrangement, the capacitor is initialized (reset) by releasing charges from the capacitor through the first switch and the second MOS transistor.

These and other objects of the present invention may also be achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode to which a clock is applied, the second MOS transistor operating in the subthreshold region; a capacitor having one terminal connected to a second electrode of the second MOS transistor via a first switch and the other terminal connected to a direct-current voltage, the capacitor integrating a signal based on a photoelectric current generated in the photodiode; a third MOS transistor having a gate electrode connected to the one terminal of the capacitor and a first electrode connected to a direct-current voltage, the third MOS transistor operating as an amplifier; a fourth MOS transistor having one terminal connected to the one terminal of the capacitor, the other terminal connected to a direct-current voltage, and a gate electrode for receiving a reset signal; and a second switch having one terminal connected to a second electrode of the third MOS transistor and the other terminal connected to an output signal line, wherein a pn junction capacitance related to a second electrode of the second MOS transistor is reset during the period during which the clock applied to the first electrode of the second MOS transistor is on a reset-voltage level while the signal from the capacitor is amplified by the third MOS transistor and read onto the output signal line by turning OFF the first switch, integration of the signal in the pn junction capacitance is initiated during the period during which the clock is on the other level, and the first switch is turned ON after the reading of the signal from the capacitor is completed to transfer charges accumulated in the pn junction capacitance to the capacitor and continue integration in the capacitor.

These and other objects of the present invention may also be achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode to which a direct-current voltage is applied, the second MOS transistor operating in the subthreshold region; a first capacitor having one terminal connected to a second electrode of the second MOS transistor and the other terminal connected to a direct-current voltage, the first capacitor integrating a signal based on a photoelectric current generated in the photodiode; a first switch having one terminal connected to the one terminal of the first capacitor; a second capacitor having one terminal connected to the other terminal of the first switch and the other terminal connected to a direct-current voltage; a third MOS transistor having a gate electrode connected to the one terminal of the second capacitor and a first electrode connected to a direct-current voltage, the third MOS transistor operating as an amplifier; a fourth MOS transistor having a first electrode connected to the one terminal of the second capacitor, a second electrode connected to a direct-current voltage, and a gate electrode for receiving a reset signal; and a second switch having one terminal connected to a second electrode of the third MOS transistor and the other terminal connected to an output signal line, wherein the subsequent integration is initiated in the first capacitor while a signal from the second capacitor is amplified by the third MOS transistor and read onto the output signal line by turning OFF the first switch, the fourth MOS transistor is turned ON to reset the second capacitor after the completion of the read operation, and then the first switch is turned ON to transfer charges from the first capacitor to the second capacitor and continue integration in the second capacitor.

These and other objects of the present invention may also be achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode to which a clock is applied, the second MOS transistor operating in the subthreshold region; a first capacitor having one terminal connected to a second electrode of the second MOS transistor and the other terminal connected to a direct-current voltage, the first capacitor integrating a signal based on a photoelectric current generated in the photodiode; a first switch having one terminal connected to the one terminal of the first capacitor; a second capacitor having one terminal connected to the other terminal of the first switch and the other terminal connected to a direct-current voltage; a third MOS transistor having a gate electrode connected to the one terminal of the second capacitor and a first electrode connected to a direct-current voltage, the third MOS transistor operating as an amplifier; and a second switch having one terminal connected to a second electrode of the third MOS transistor and the other terminal connected to an output-signal line, wherein the voltage integrated in the first capacitor is transferred to the second capacitor by turning ON the first switch and then the signal, based on the charge in the second capacitor, is amplified by the third MOS transistor and read out onto the output signal line by turning OFF the first switch, and further the first and second capacitors are simultaneously reset by providing a reset voltage to the first electrode of the second MOS transistor while the first switch is turned on again.

These and other objects of the present invention may also be achieved by a two-dimensional solid-state image pickup device comprising pixels arranged to form a matrix, each of the pixels including: a photodiode; a first MOS transistor having a first electrode and a gate electrode each connected to one electrode of the photodiode, the first MOS transistor operating in a subthreshold region; a second MOS transistor having a gate electrode connected to the gate electrode of the first MOS transistor and a first electrode to which a clock is applied, the second MOS transistor operating in the subthreshold region; a first capacitor having one terminal connected to a second electrode of the second MOS transistor and the other terminal connected to a direct-current voltage, the first capacitor integrating a signal based on a photoelectric-current generated in the photodiode; a first switch having one terminal connected to the one terminal of the first capacitor; a second capacitor having one terminal connected to the other terminal of the first switch and the other terminal connected to a direct-current voltage; a third MOS transistor having a gate electrode connected to the one terminal of the second capacitor and a first electrode connected to a direct-current voltage, the third MOS transistor operating as an amplifier; a fourth MOS transistor having a first electrode connected to the one terminal of the second capacitor, a second electrode connected to a direct-current voltage, and a gate electrode to which a reset voltage is applied; and a second switch having one terminal connected to a second electrode of the third MOS transistor and the other terminal connected to an output signal line, wherein the first capacitor is reset during the period during which the clock applied to the second electrode of the second MOS transistor is on a reset-voltage level while a signal from the second capacitor is amplified by the third MOS transistor by turning OFF the first switch, integration in the first capacitor is initiated during the period during which the clock is on the other level, the fourth MOS transistor is turned ON to reset the second capacitor after the completion of a read operation, and then the first switch is turned ON to transfer charges from the first capacitor to the second capacitor and continue the integration in the second capacitor.

In the various configurations, MOS transistors may be connected to the individual pixels, so that each of the MOS transistors, which are connected to the corresponding pixel via the output signal line, serve as a load resistor to the third MOS transistor on the source side of the third MOS transistor.

Additionally, each of the resistor MOS transistors having a first electrode connected to the fifth MOS transistor of each of the pixels arranged in the corresponding row can have a second electrode connected to a direct-current voltage and a gate electrode connected to a direct-current voltage.

Additionally, each of the resistor MOS transistors which have a first electrode connected to the second switch of each of the pixels arranged in the corresponding row, can have a second electrode connected to a direct-current voltage and a gate electrode connected to a direct-current voltage.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers wherein.

Figure 1:
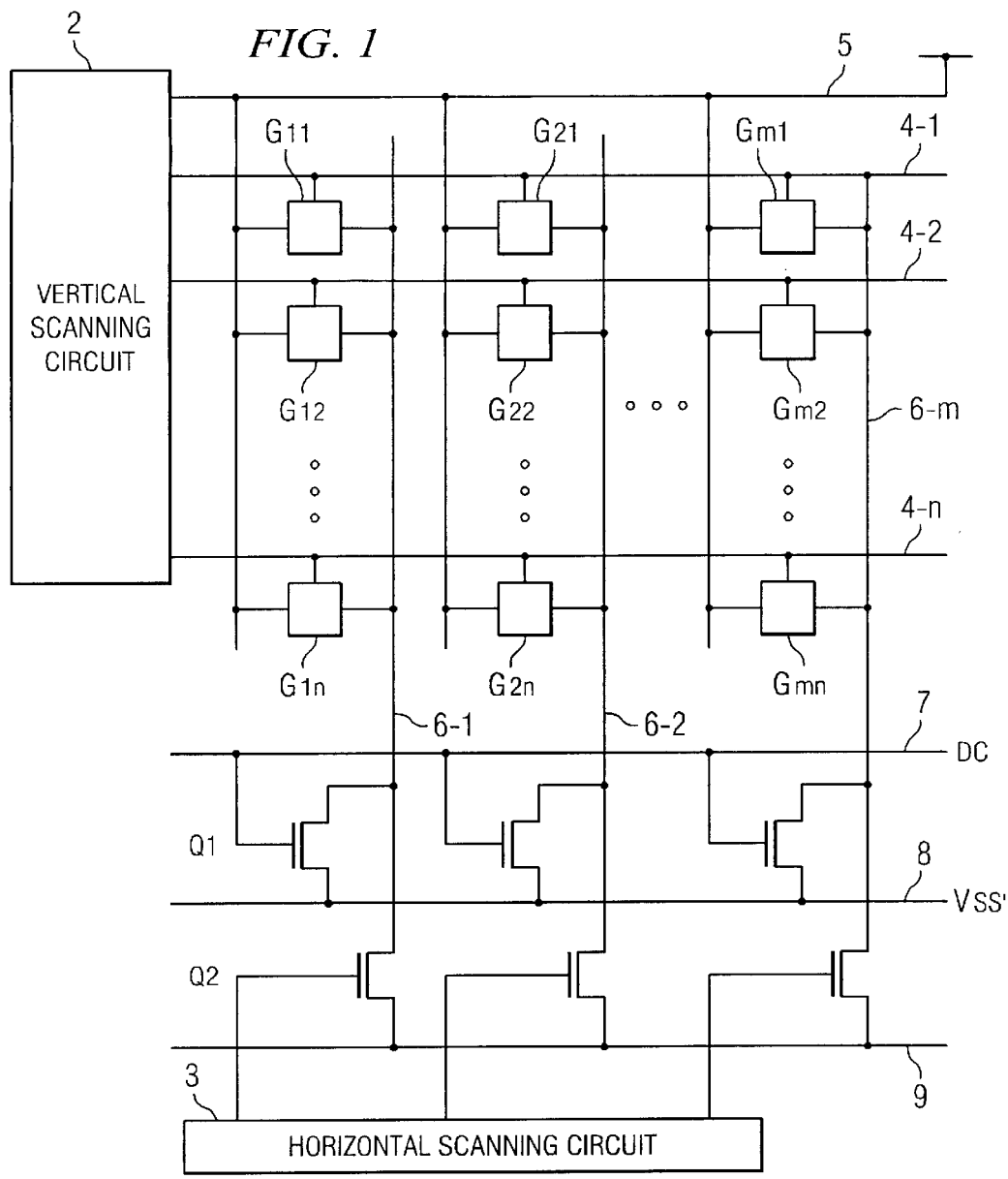
FIG. 1 is a block circuit diagram for illustrating the entire structure of a two-dimensional solid-state image pickup apparatus according to a first embodiment of the present invention.

In the various figures, the reference numerals have the following meanings:

| | |
|---|---|
| G11 to Gmn | pixels |
| 2 | vertical scanning circuit |
| 3 | horizontal scanning circuit |
| 4-1 to 4-n | column select lines |
| 6-1 to 6-m | output signal lines |
| PD | photodiode |
| T1 to T6 | first to sixth MOS transistors |
| C | capacitor |
| C1, C2 | first and second capacitors |
| Cs | pn junction capacitance |

DETAILED DESCRIPTION OF THE PREFERRED EMBODIMENTS

Figure 3:
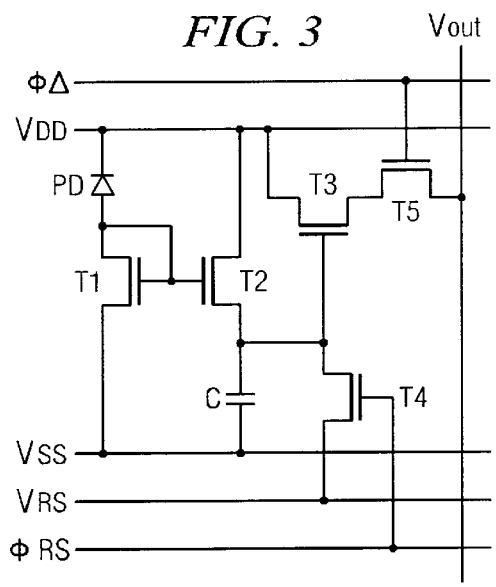
FIG. 3 is a circuit diagram showing the structure of each pixel according to a first embodiment of the present invention.

Referring now to the drawings, the individual embodiments of a solid-state image pickup device according to the present invention will be described. FIG. 1 schematically shows a part of the two-dimensional MOS solid-state image pickup device according to an embodiment of the present invention. In the drawing, reference numerals G11 to Gmn denote-pixels arranged in rows and columns (n by m in matrix arrangement), 2 denotes a vertical scanning circuit for sequentially scanning columns (lines) 4-1 to 4-n, 3 denotes a horizontal scanning circuit for sequentially horizontally reading photoelectric conversion signals led out from the individual pixels onto output signal lines 6-1 to 6-m on a pixel-by-pixel basis, and 5 denotes a power-source line. Although in FIG. 1 the individual pixels are shown connected only to the foregoing lines 4-1 to 4-n and output signal lines 6-1 to 6-m, they are also connected to other lines (e.g., a clock line, a bias supply line, and the like). The depiction of the other lines is omitted in FIG. 1 for clarity; the other lines are shown in FIG. 3 and the subsequent drawings illustrating the individual embodiments.

As shown in the drawing, a pair of n-channel MOS transistors Q1 and Q2 are provided for each of output lines 6-1 to 6-m. The MOS transistor Q1 has a gate connected to a direct-current voltage line 7, a drain connected to an output signal line 6-1, and a source connected to a line 8 at a direct-current voltage VSS'. On the other hand, MOS transistor Q2 has a drain connected to the output signal line 6-1, a source connected to a final signal line 9, and a gate connected to the horizontal scanning circuit 3.

Figure 2A:
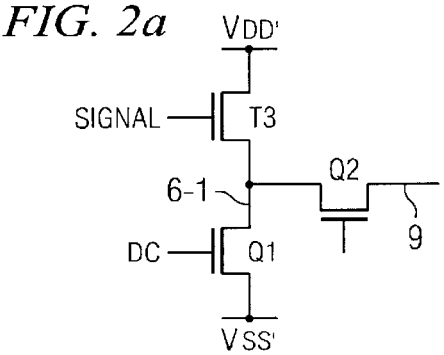
FIGS. 2(a)–(b) are circuit diagrams each showing a part of the image pickup device of FIG. 1.

As will be described later, each of the pixels G11 to Gmn is provided with a third MOS transistor T3 as an amplifier for amplifying a voltage resulting from photoelectric charges generated in the pixel. The connecting relationship between the amplifier MOS transistor T3 and the MOS transistor Q1 is as shown in FIG. 2(a). Here, the relationship between the direct-current voltage VSS' connected to the source of the MOS transistor Q1 and the direct-current voltage VDD' connected to the drain of the third MOS transistor T3 is expressed as VDD'>VSS', where the direct-current voltage VSS' is, e.g., a ground voltage. In the circuit structure, a signal is inputted to the gate of the upper-stage MOS transistor T3 and the direct-current voltage is constantly applied to the gate of the lower-stage MOS transistor Q1. Consequently, the lower-stage MOS transistor Q1 is equivalent to a resistor and the circuit shown in FIG. 2(a) serves as a source-follower amplifier circuit. In this case, it may be considered that an electric current is amplified and outputted from the MOS transistor T3.

Figure 2B:
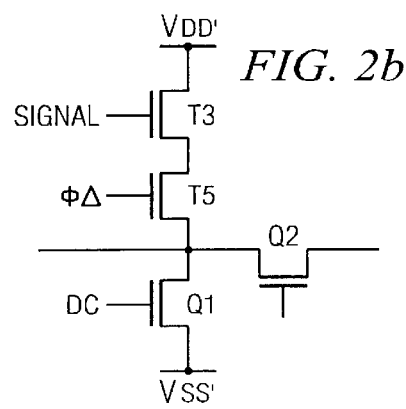

The MOS transistor Q2 is controlled by the horizontal scanning circuit 3 to operate as a switching element. It is to be noted that a fifth MOS transistor T5 for switching is also provided in each of the pixels according to each of the embodiments, as will be described later. If the circuit shown in FIG. 2(a) is depicted more precisely in conjunction with the fifth MOS transistor T5, the circuit shown in FIG. 2(b) is obtained. Specifically, a fifth MOS transistor is interposed between the MOS transistor Q1 and the third MOS transistor T3. The fifth MOS transistor T5 is for selecting among columns, while the transistor Q2 is for selecting among rows. The structure shown in FIGS. 1 and 2 is common to the first to ninth embodiments which will be described below. In each of these embodiments, the structure as shown in FIG. 2 allows a signal with increased gain to be outputted.

In the case of logarithmically converting a photoelectric current for an enlarged dynamic range, an output signal from each of the pixels is small without any alterations thereto. However, since the present circuit amplifies the output signal to provide a sufficiently large signal, signal processing to be performed by the subsequent signal processor circuit (not shown) is facilitated. Moreover, since the transistor Q1, which composes the load resistor portion of the amplifier circuit, is provided for each of the output signal lines 6-1 to 6-m to which the plurality of pixels arranged in rows are connected, and is not provided within each of the pixels, the number of load resistors can be reduced, which in turn reduces the area occupied by the amplifier circuits on a semiconductor chip.

A description will be given to each of the embodiments by referring to the structure of each pixel portion. Although, in the following descriptions and associated figures, a signal is described as being amplified by the third MOS transistor T3 and led out onto the output signal line, it should be appreciated that, more precisely, the voltage of the signal is amplified by the combination of the third MOS transistor T3 and the MOS transistor Q1 acting as the load resistor. For clarity, MOS transistor Q1 acting as the load resistor is omitted from the illustrations of the pixel circuit in each of the preferred embodiments. It is to be noted that the expression "connection to a direct-current voltage" used in the present specification includes connection to the ground voltage, i.e., "grounding." Referring to the structure of each pixel portion, the individual embodiments will be described below.

First Embodiment

In FIG. 3, a pn photodiode forms a photosensitive element (photoelectric converting element). The photodiode PD has an anode connected to the drain and gate of a first MOS transistor T1 and to the gate of a second MOS transistor T2. The second MOS transistor T2 has a source connected to the gate of a third MOS transistor T3 and to the drain of a fourth MOS transistor T4. A direct-current voltage VDD is applied to the drain of the third MOS transistor T3. The third MOS transistor T3 has a source connected to the drain of a fifth MOS transistor T5. The fifth MOS transistor TS has a source connected to an output signal line Vout (corresponding to 6-1 to 6-m of FIG. 1)

A direct-current voltage VDD is applied to the cathode of the pn photodiode PD, to the drain of the second MOS transistor T2, and to the drain of the third MOS transistor T3. On the other hand, a direct-current voltage Vss is applied to the source of the first MOS transistor T1, while the direct-current voltage Vss is also applied to the source of the second MOS transistor T2 via a capacitor C. A direct-current voltage VRS is applied to the source of a fourth MOS transistor T4. Each of the first and second MOS transistors T1 and T2 is biased to operate in a subthreshold region.

When light is incident upon the photodiode PD, a photoelectric current is generated and a voltage having a value obtained by logarithmically converting the photoelectric current is generated at the gate of the first MOS transistor T1 in accordance with the subthreshold characteristic of the MOS transistor. As a result of the voltage, a charge equivalent to a value obtained by logarithmically converting the integral of the photoelectric current is accumulated in the capacitor C. When a pulse $\Phi V$ is supplied to the gate of the fifth MOS transistor T5 to turn the MOS transistor T5 ON, a current proportional to the charge accumulated in the capacitor C is led out onto the output signal line Vout through the third and fifth MOS transistors T3 and T5, whereby a signal (output voltage) proportional to the logarithm of the quantity of incident light is read out. After the reading of the signal, the voltage on the capacitor C and the gate voltage of the third MOS transistor T3 can be initialized by turning OFF the fifth MOS transistor T5 and turning ON the fourth MOS transistor T4.

Second Embodiment

Figure 4:
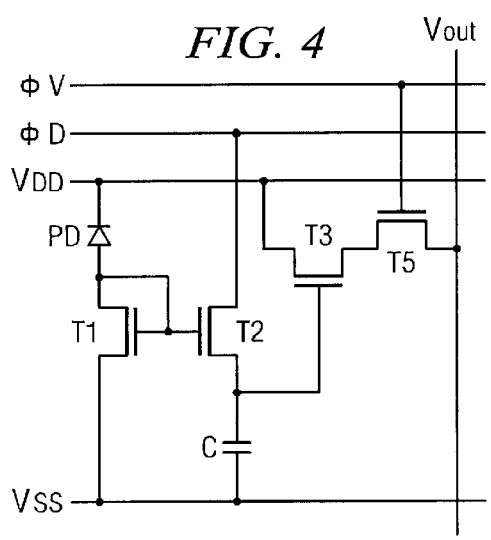
FIG. 4 is a circuit diagram showing the structure of each pixel according to a second embodiment of the present invention.

As shown in FIG. 4, a second embodiment is so constituted as to reset, (initialize) the voltage on the capacitor C and the gate voltage of the third MOS transistor T3 by supplying a clock $\Phi D$ to the drain of the second MOS transistor T2 in the absence of the fourth MOS transistor T4 which was employed in the first embodiment. The other components are the same as in the first embodiment (FIG. 3). During the period during which the clock $\Phi D$ is on the HIGH level, integration in the capacitor C is performed. During the period during which the clock $\Phi D$ is on the LOW level, charges are released from the capacitor C through the second MOS transistor T2 so that the voltage on the capacitor C and the gate voltage of the third MOS transistor T3 is set to a value approximately equal to the LOW level of the clock $\Phi D$. Since the fourth MOS transistor T4 is not provided in the second embodiment, the structure thereof is simplified accordingly.

Third Embodiment

Figure 5:
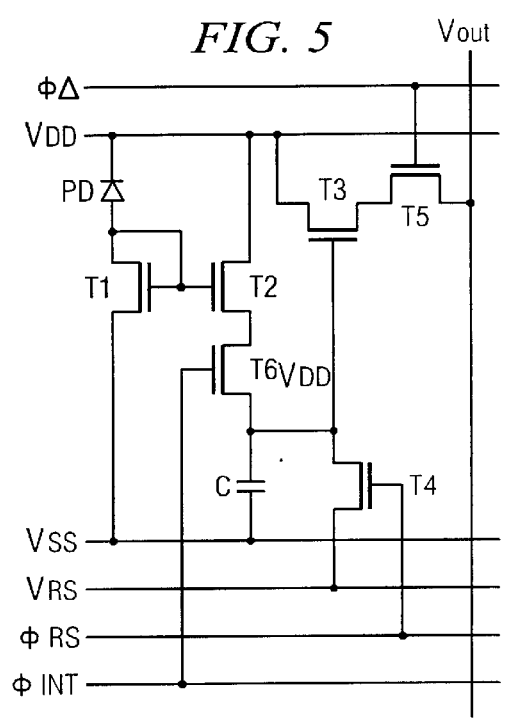
FIG. 5 is a circuit diagram showing the structure of each pixel according to a third embodiment of the present invention.

As shown in FIG. 5, a third embodiment is characterized in that an n-channel sixth MOS transistor T6 is interposed as a switch between the second MOS transistor T2 and the capacitor C, which is different from the first embodiment (FIG. 3). The sixth MOS transistor T6 has a drain connected to the source of the second MOS transistor T2, a source connected to the capacitor C, and a gate to which an integration-time control voltage (switching voltage) $\Phi_{INT}$ is applied. An integrating operation for the capacitor C is performed with the integration-time control voltage $\Phi_{INT}$ being on the HIGH level and with the sixth MOS transistor T6 being in the ON state. To read a signal from the capacitor C, the fifth MOS transistor T5 is turned ON with the integration-time control voltage $\Phi_{INT}$ being on the LOW level so that the sixth MOS transistor T6 is in the OFF state, so that the signal is read onto the output signal line Vout through the third and fifth MOS transistors T3 and T5.

After the reading of the signal, the fourth MOS transistor T4 is turned ON with the fifth MOS transistor T5 being in the OFF state and with the sixth MOS transistor T6 being in the OFF state so as to reset (initialize) the voltage on the capacitor C and the gate voltage of the third MOS transistor T3. Thereafter, the sixth MOS transistor T6 is turned ON to perform integration in the capacitor C. In the third embodiment, if the integration-time control voltage $\Phi_{INT}$ pulse is supplied simultaneously for an equal period to the gate of the sixth MOS transistor T6 of each of the pixels arranged in two dimensions, the charges simultaneously integrated in the capacitors C of the individual pixels can be accumulated for equal periods.

Fourth Embodiment

Figure 6:
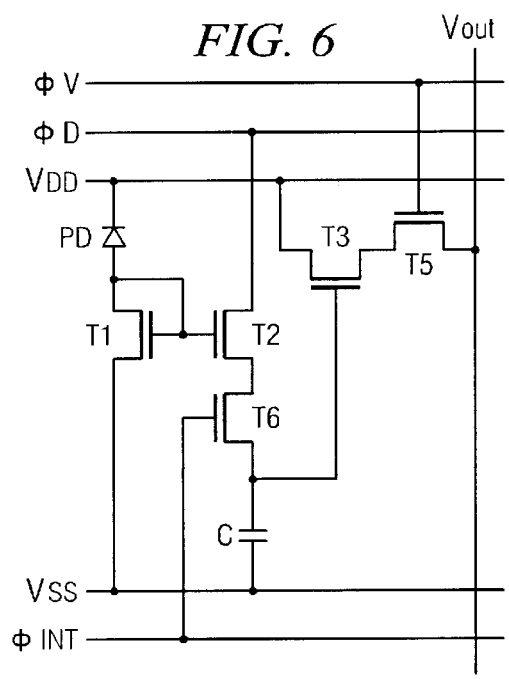
FIG. 6 is a circuit diagram showing the structure of each pixel according to a fourth embodiment of the present invention.

As shown in FIG. 6, a fourth embodiment is different from the first embodiment (FIG. 3) in that the fourth MOS transistor T4 is not provided, the clock $\Phi D$ is supplied to the drain of the second MOS transistor T2, and the sixth MOS transistor T6 is interposed as a switch between the source of the second MOS transistor and the capacitor C. As the other components are the same as in the first embodiment. The sixth MOS transistor T6 has the drain connected to the source of the second MOS transistor T2, a source connected to the capacitor, and the gate to which the integration-time control voltage $\Phi_{INT}$ is applied.

When the photodiode PD is irradiated with light, a photoelectric current is generated and a voltage having a value obtained by logarithmically converting the photoelectric current is generated at the gate of the first MOS transistor T1 in accordance with the subthreshold characteristic of the MOS transistor. As a result of the voltage, charges equivalent to a value obtained by logarithmically-converting the integral of the photoelectric current are accumulated in the capacitor C. If the integration-time control voltage $\Phi_{INT}$ pulse is supplied simultaneously for an equal period to the gate of the sixth MOS transistor T6 of each of the pixels arranged in two dimensions to turn the sixth MOS transistor ON, the charge integrated simultaneously in the capacitors C of the individual pixels can be accumulated for equal periods.

When the pulse $\Phi V$ is supplied to the gate of the fifth MOS transistor T5 to turn the MOS transistor T5 ON, an electric current proportional to the charges (dependent on the quantity of charges in the capacitor C) accumulated in the gate of the third MOS transistor T3 is led out onto the output signal line Vout through the third and fifth MOS transistors T3 and T5, whereby a signal proportional to the logarithm of the quantity of incident light is read out. After the reading of the signal, the voltage on the capacitor C and the gate voltage of the third MOS transistor T3 can be initialized by turning OFF the fifth MOS transistor T5 and turning ON the sixth MOS transistor T6, and supplying a clock $\Phi D$ to the drain of the second. MOS transistor T2 for initializing the capacitor C.

Fifth Embodiment

Figure 7:
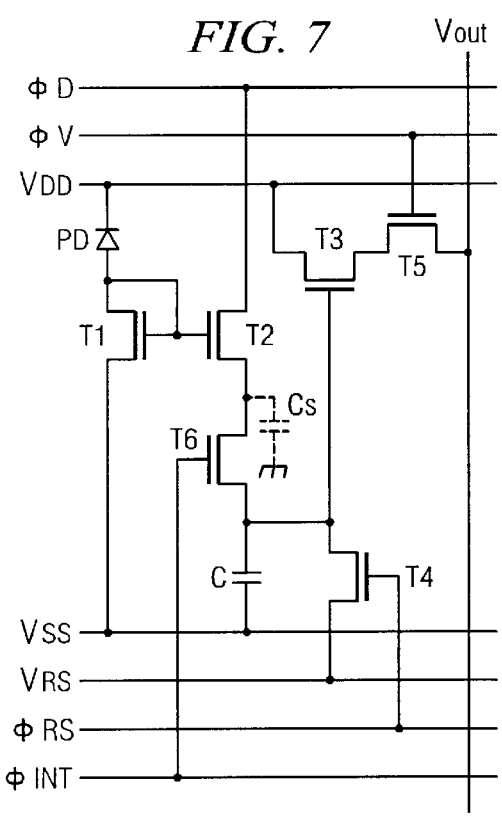
FIG. 7 is a circuit diagram showing the structure of each pixel according to a fifth embodiment of the present invention.

As shown in FIG. 7, the fifth embodiment is primarily different from the third embodiment (FIG. 5) in that the clock $\Phi D$ is supplied to the drain of the second MOS transistor T2. In the drawing, Cs denotes a pn junction capacitance related to the source of the second MOS transistor T2 (the drain of the sixth MOS transistor T6).

Figure 23:
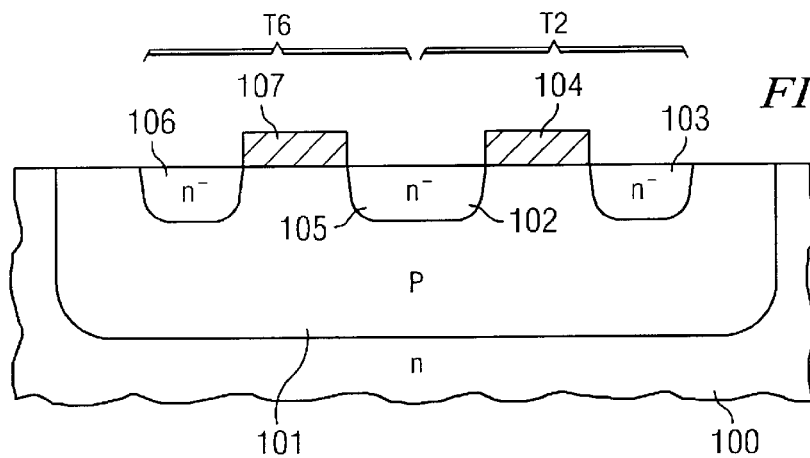
FIG. 23 shows the structure of a junction capacitance according to the fifth embodiment.
Figure 24:
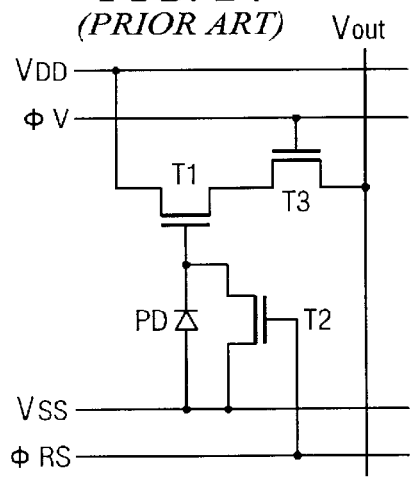
FIG. 24 is a circuit diagram showing the structure of each pixel according to a conventional embodiment.

As shown in FIG. 23, the junction capacitance Cs is formed between the P-well layer 101 and the source region 102 of the second MOS transistor T2 each formed in an n-type semiconductor substrate 100. It is to be noted that the source region 102 also serves as the drain region 105 of the sixth MOS transistor T6. In the drawing, a reference numeral 103 denotes the drain region of the second MOS transistor T2, a reference numeral 106 denotes the source region of the sixth MOS transistor T6, reference numerals 104 and 107 denote the respective gate electrodes of the second and sixth MOS transistors T2 and T6.

When the photodiode PD is irradiated with light, a photoelectric current is generated and a voltage having a value obtained by logarithmically converting the photoelectric current is generated at the gate of the first MOS transistor T1 in accordance with the subthreshold characteristic of the MOS transistor. As a result of this voltage, a charge equivalent to a value obtained by logarithmically converting the integral of the photoelectric current is accumulated in the capacitor C. If the integration-time control voltage $\Phi_{INT}$ pulse is supplied simultaneously for an equal period to the gate of the sixth MOS transistor T6 of each of the pixels to turn the sixth MOS transistor T6 ON, the charges integrated simultaneously in the capacitors C of the individual pixels can be accumulated for equal periods.

At the completion of integration in each of the pixels, the sixth MOS transistor T6 is turned OFF and a pulse $\Phi V$ is supplied to the gate of the fifth MOS transistor T5 to turn the MOS transistor T5 ON. When the fifth MOS transistor T5 is turned on, an electric current proportional to the charge accumulated at the gate of the third MOS transistor T3 is led out onto the output signal line Vout through the third and fifth MOS transistors T3 and T5, whereby a signal proportional to the logarithm of the quantity of incident light is read out. At the completion of integration in each of the pixels (that is, after the sixth MOS transistor T6 is turned OFF), a LOW-Level clock $\Phi D$ pulse is supplied to the drain of the second MOS transistor T2 to initialize the source of the second MOS transistor T2 (the drain of the sixth MOS transistor), i.e., to initialize (reset) the junction capacitance Cs. After that, while the sixth MOS transistor T6 remains OFF, the clock $\Phi D$ shifts to the HIGH level so that the signal from the photodiode can be integrated in the junction capacitance Cs during the period during where the signal previously stored in the capacitor C are read out via third and fifth MOS transistors T3 and TB.

After signals from all the pixels (signals for the current frame) are read out, the fourth MOS transistor T4 is turned ON to initialize the voltage on the capacitor C and the gate voltage of the third MOS transistor T3. Then, the fourth MOS transistor T4 is turned OFF to turn the sixth MOS transistor T6 ON to transfer the charge that has accumulated in the junction capacitance Cs to the capacitor C. Thereafter, the signal from the photodiode is integrated in the capacitor C. Thus, this approach provides the functions of (1) performing simultaneous integration for an equal period in each of the pixels due to the integration control switch, sixth MOS transistor T6; and compatibility with a dynamic picture based on reduced exposure time requirements, due to the fact that the signal from the photo diode is integrated (in the pn junction capacitance) even while the signal accumulated in the capacitor C is read out.

Sixth Embodiment

Figure 8:
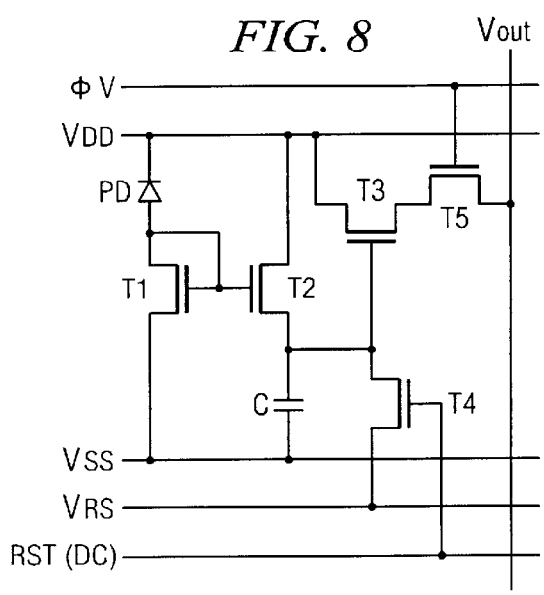
FIG. 8 is a circuit diagram showing the structure of each pixel according to a sixth embodiment of the present invention.

As shown in FIG. 8, a sixth embodiment is different from the first embodiment (FIG. 3) in that a specified direct-current voltage RST (DC) is constantly applied as the reset voltage to the gate of the fourth MOS transistor T4. The other components are the same as in the first embodiment. In the present embodiment, the fourth MOS transistor T4, which is constantly in the ON state, behaves substantially equivalent to a resistor having a specified value so that the circuit is equivalent to one having a resistor connected in parallel with the capacitor. Consequently, in the absence of a signal on the capacitor via second MOS transistor T2, the initial value of the capacitor is determined by the voltage across the resistor. Furthermore, the initial voltage value can be adjusted by varying the direct-current voltage applied to the gate electrode of the fourth MOS transistor T4.

Seventh Embodiment

Figure 9:
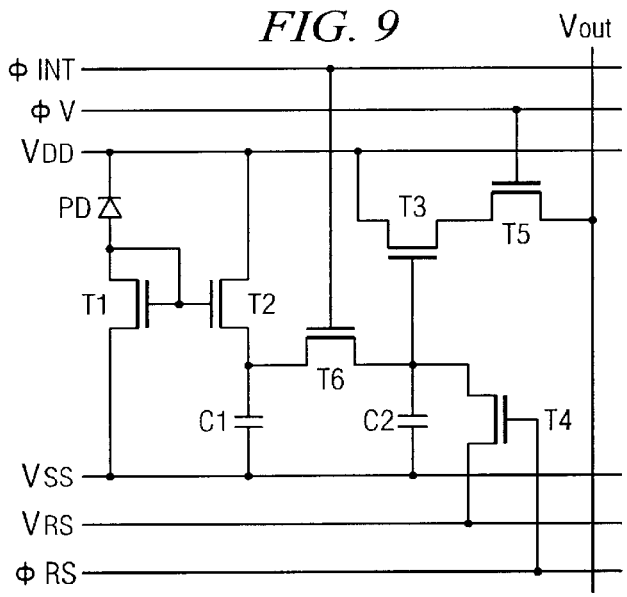
FIG. 9 is a circuit diagram showing the structure of each pixel according to a seventh embodiment of the present invention.

As shown in FIG. 9, a seventh embodiment is shown which is different from the first embodiment (FIG. 3) in that two capacitors C1 and C2 are provided as the integrating capacitor, and the sixth MOS transistor T6 is composed of an n-channel MOS transistor connected as a switch between the two capacitors C1 and C2. The other components are substantially the same as in the first embodiment. In FIG. 9, the first capacitor C1 is connected between the source of the second MOS transistor T2 and the direct-current voltage Vss. The sixth MOS transistor T6 has the drain connected as the switch to one terminal of the first capacitor C1 and to the source of the second MOS transistor T2. The second capacitor C2 is connected between the source of the sixth MOS transistor T6 and a direct-current voltage Vss. On the other hand, the third MOS transistor T3 has the gate connected to the second capacitor C2 and to the source of the sixth MOS transistor T6.

When the photodiode PD is irradiated with light, a photoelectric current is generated and a voltage having a value obtained by logarithmically converting the photoelectric current is generated at the gate of the first MOS transistor T1 in accordance with the subthreshold characteristic of the MOS transistor. As a result of this voltage, a charge equivalent to a value obtained by logarithmically converting the integral of the photoelectric current is accumulated in the first capacitor C1. Then, the sixth MOS transistor T6 is turned ON so that the charge integrated in the first capacitor C1 is transferred to the second capacitor C2. If the second capacitor C2 selected has capacitance sufficiently large compared with that of the first capacitor C1, the majority of the charge in the first capacitor C1 is transferred to the second capacitor C2. Because C2 is sufficiently large compared to C1, after the charge in the first capacitor C1 is transferred to the second capacitor C2, the first capacitor C1 is substantially reset to the initial voltage of the second capacitor C2. In operation, after the transfer of the charge to the second capacitor C2, integration of a signal from the photodiode is continued with the sixth MOS transistor T6 is turned ON so that the charge is integrated in the first capacitor C1 and the second capacitor C2.

At the end of the signal integration period, the sixth MOS transistor is turned OFF and a pulse ΦV is supplied to the gate of the fifth MOS transistor T5 to turn the fifth MOS transistor T5 ON, whereby an electric current proportional to the charge (dependent on the quantity of charge in the second capacitor C2) which is accumulated at the gate of the third MOS transistor T3 is led out onto the output signal line Vout through the third and fifth MOS transistors T3 and T5. This allows an output current proportional to the logarithm of the quantity of incident light to be read out. After the signal is read out, the voltage on the second capacitor C2 and the gate voltage of the third MOS transistor T3 can be initialized by turning OFF the fifth MOS transistor T5 and turning ON the fourth MOS transistor T4. In the present embodiment, the timing for integration (i.e., an integration time) for each of the pixels can be equalized by equally controlling the sixth MOS transistor T6 of each of the pixels.

Eighth Embodiment

Figure 10:
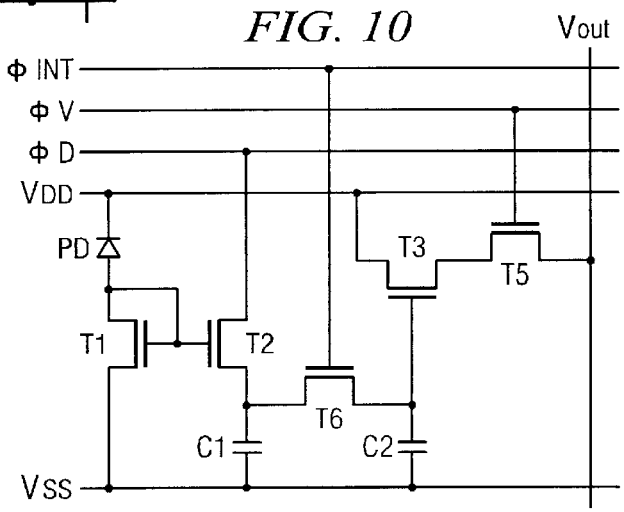
FIG. 10 is a circuit diagram showing the structure of each pixel according to an eighth embodiment of the present invention.

As shown in FIG. 10, an eighth embodiment is different from the seventh embodiment (FIG. 9) in that the clock ΦD is applied to the drain of the second MOS transistor T2 in the absence of the fourth MOS transistor T4. The other components and connecting relations are substantially the same as in the seventh embodiment. In the present embodiment, the integration in the first capacitor C1, the transfer of the integrated charges to the second capacitor C2, and the reading of the content of the second capacitor C2 are performed in the same manner as in the seventh embodiment.

In resetting the capacitor C2 after the reading of the signal is completed, a LOW-Level clock ΦD pulse is supplied to the drain of the second MOS transistor T2 while the sixth MOS transistor T6 is held in the ON state. As a result, the charge is released from the first capacitor C1 through the second MOS transistor T2, while charges are released from the second capacitor C2 through the sixth and second MOS transistors T6 and T2. As a result, the first and second capacitors C1 and C2 are simultaneously placed at the LOW-level voltage of the clock ΦD (initialization)

Ninth Embodiment

Figure 11:
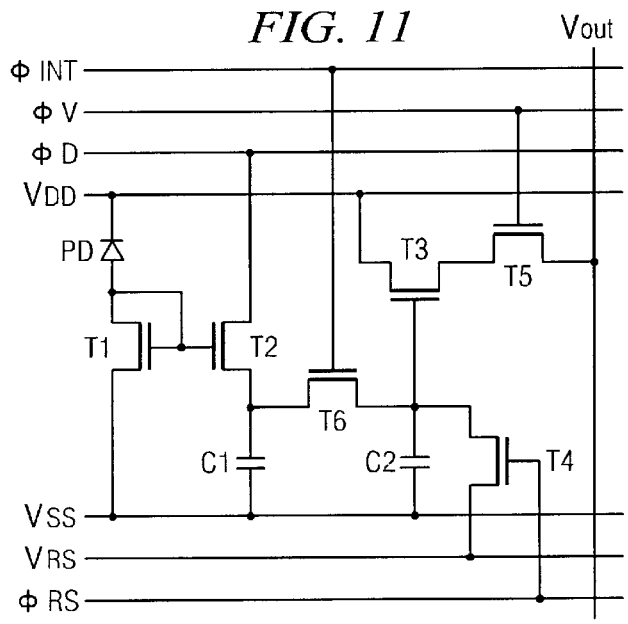
FIG. 11 is a circuit diagram showing the structure of each pixel according to a ninth embodiment of the present invention.

As shown in FIG. 11, a ninth embodiment is different from the seventh embodiment (FIG. 9) in that a clock ΦD is applied to the drain of the second MOS transistor T2. The other components are the same as in the seventh embodiment. In the present embodiment, the resetting (initialization) of the first capacitor C1 is performed independently of the resetting (initialization) of the second capacitor C2. Specifically, the resetting of the first capacitor C1 is performed by applying a Low-level clock ΦD pulse voltage to the drain of the second MOS transistor T2, while the resetting of the second capacitor C2 is performed by turning ON the fourth MOS transistor T4.

When the photodiode PD is irradiated with light, a photoelectric current is generated and a voltage having a value obtained by logarithmically converting the photoelectric current is generated at the gate of the first MOS transistor T1 in accordance with the subthreshold characteristic of the MOS transistor. As a result of the voltage, a charge equivalent to a value obtained by logarithmically converting the integral of the photoelectric current is accumulated in the first capacitor C1. Consequently, if a LOW-level clock ΦD pulse is supplied simultaneously for an equal period to the drain T2 of the second-MOS transistor T2 of each of the pixels to initiate integration in the capacitor C1, and then the sixth MOS transistor T6 of each of the pixels is turned ON, the bulk of the charge integrated in the first capacitor C1 are transferred to the second capacitor C2. If the integration-time control voltage $\Phi_{INT}$ pulse is supplied simultaneously for an equal period to the gate of the sixth MOS transistor T6 of each of the pixels to turn the sixth MOS transistor T6 ON, the charges integrated simultaneously in the second capacitors C2 of the individual pixels can be accumulated for equal periods.

After the signal has been integrated in the second capacitors C2, a pulse ΦV is supplied to the gate of the fifth MOS transistor to turn the fifth MOS transistor T5 ON, whereby a signal proportional to the charge (dependent on the quantity of charge in the second capacitor C2) accumulated at the gate of the third MOS transistor T3 is led out onto the output signal line Vout through the third and fifth MOS transistors T3 and T5. In this manner, the signal proportional to the logarithm of the quantity of incident light can be read out. At the completion of integration in each of the pixels (after the sixth MOS transistor T6 is turned OFF), a LOW-level clock ΦD pulse voltage is supplied to the drain of the second MOS transistor T2 to initialize the first capacitor C1, and then signals for the subsequent frame are accumulated in the first capacitor C1 during the period during which the signal is read out of the second capacitor C2.

After the signals for all the pixels are read out, the fourth MOS transistor T4 is turned ON to initialize the voltage on the second capacitor C2 and the gate voltage of the third MOS transistor T3. Subsequently, the sixth MOS transistor T6 is turned ON to transfer the charge accumulated in the first capacitor C1 to the second capacitor C2 and thereby continue the integration. This provides the function of performing simultaneous integration for an equal period for each of the pixels and shortened exposure time for compatibility with a dynamic picture.

Figure 13A:
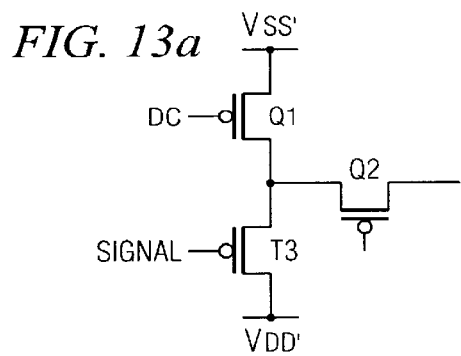
FIG. 13 are circuit diagrams each showing a part of the image pickup device of FIG. 12.
Figure 13B:
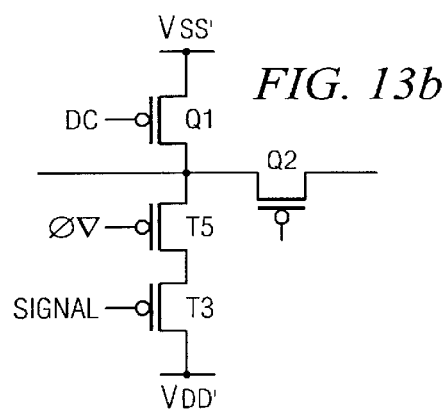
Figure 14:
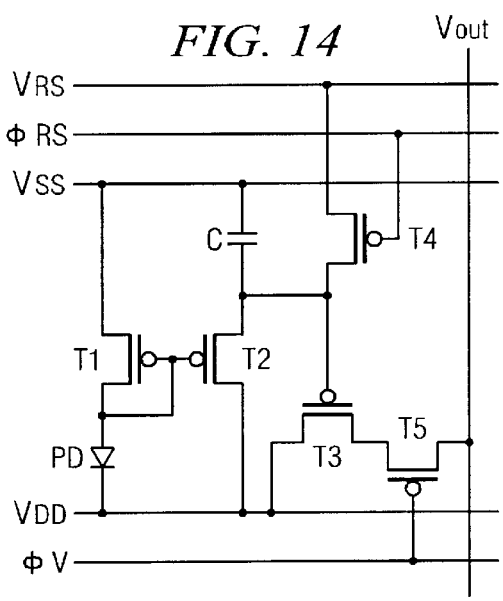
FIG. 14 is a circuit diagram showing the structure of each pixel according to a tenth embodiment of the present invention.
Figure 15:
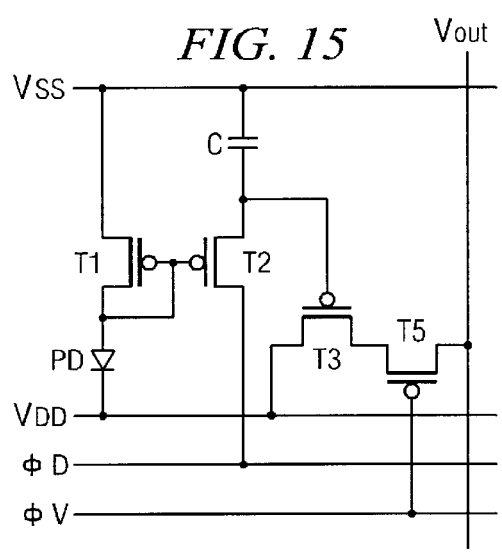
FIG. 15 is a circuit diagram showing the structure of each pixel according to an eleventh embodiment of the present invention.
Figure 16:
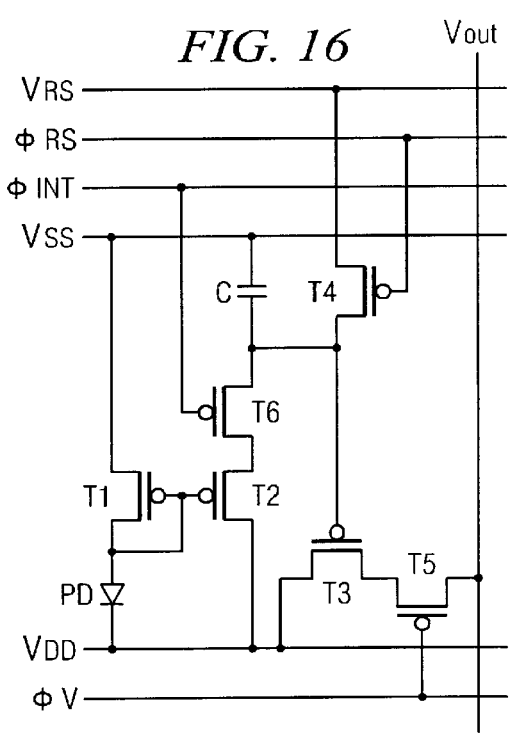
FIG. 16 is a circuit diagram showing the structure of each pixel according to a twelfth embodiment of the present invention.
Figure 17:
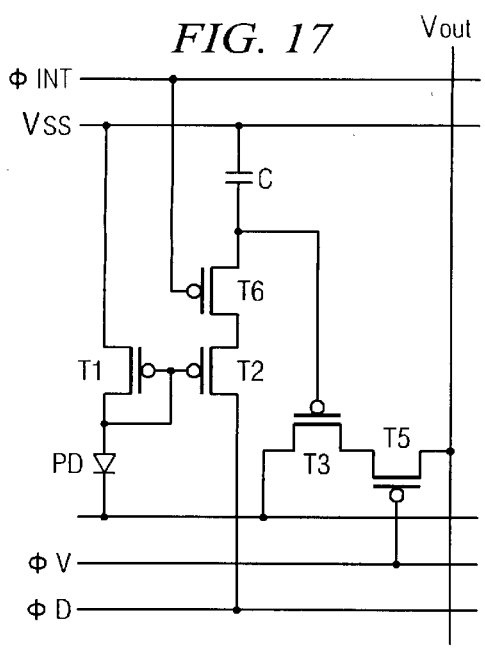
FIG. 17 is a circuit diagram showing the structure of each pixel according to a thirteenth embodiment of the present invention.
Figure 18:
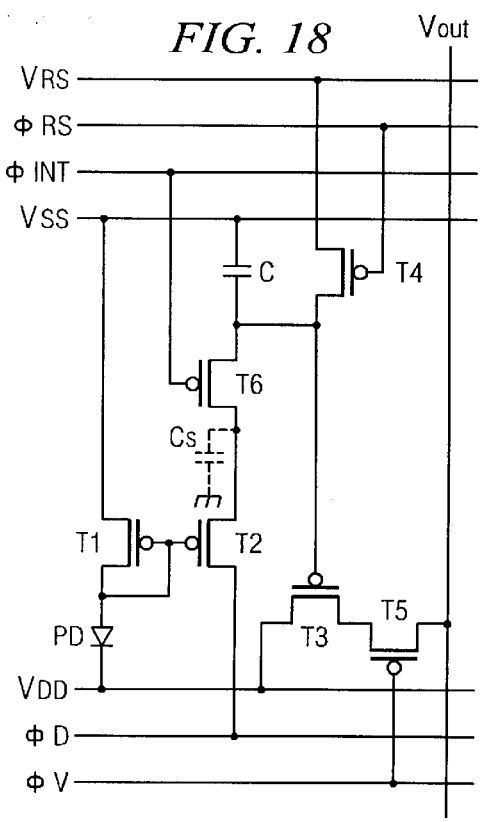
FIG. 18 is a circuit diagram showing the structure of each pixel according to a fourteenth embodiment of the present invention.
Figure 19:
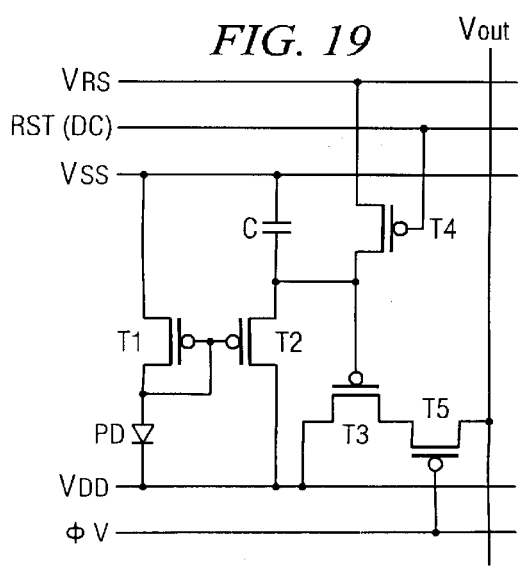
FIG. 19 is a circuit diagram showing the structure of each pixel according to a fifteenth embodiment of the present invention.
Figure 20:
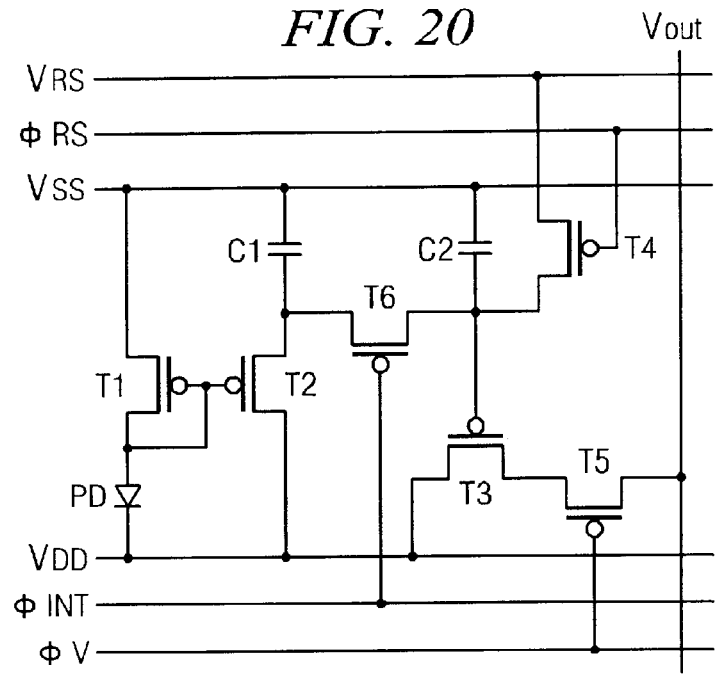
FIG. 20 is a circuit diagram showing the structure of each pixel according to a sixteenth embodiment of the present invention.
Figure 21:
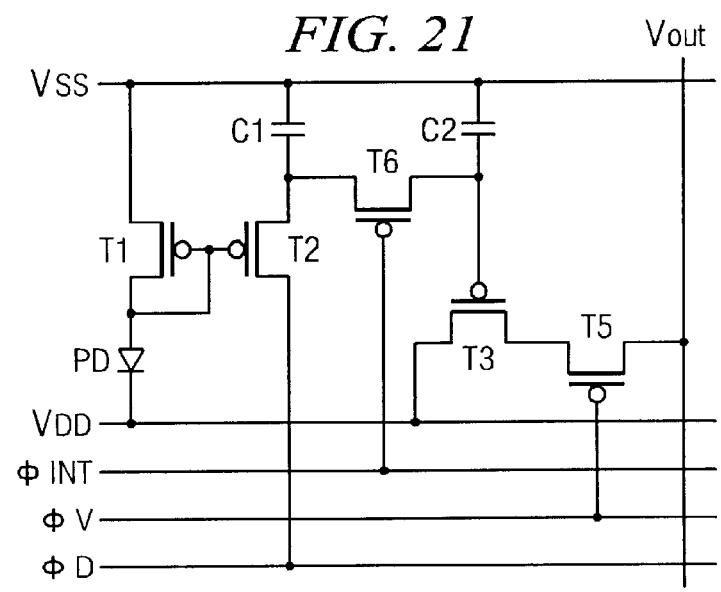
FIG. 21 is a circuit diagram showing the structure of each pixel according to a seventeenth embodiment of the present invention.
Figure 22:
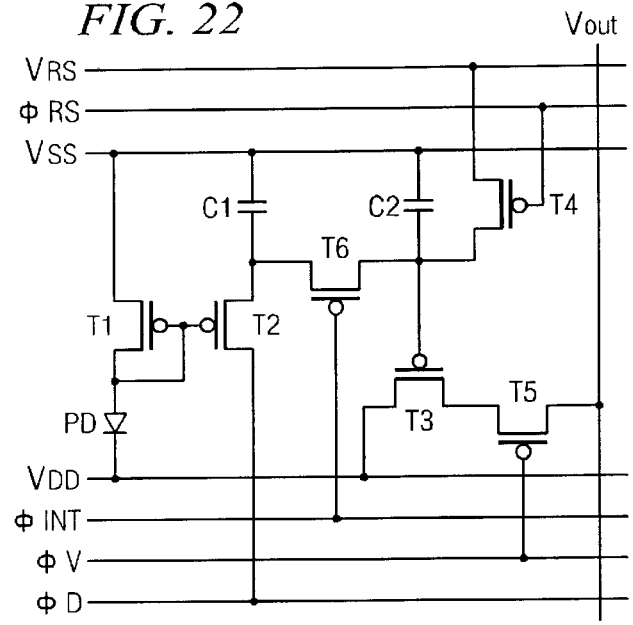
FIG. 22 is a circuit diagram showing the structure of each pixel according to an eighteenth embodiment of the present invention.

Although, in each of the first through ninth embodiments, each of the MOS transistors T1 to T6, which are active elements in the pixels, is composed of an n-channel MOS transistor, each may alternatively be composed of a p-channel MOS transistor. FIGS. 14 to 22 show the tenth to eighteenth embodiments in which each of the MOS transistors T1 to T6 is composed of a p-channel MOS transistor. Accordingly, connecting relations and the polarity of an applied voltage are reversed in FIGS. 12 to 22 as compared to the first through ninth embodiments. In FIG. 14 (Embodiment 10), for example, the photodiode PD has the anode connected to the direct-current voltage VDD and the cathode connected to the drain and gate of the first MOS transistor T1 and to the gate of the second MOS transistor T2. On the other hand, the first MOS transistor has the source connected to the direct-current voltage Vss.

In this case, the relationship between the direct-current voltages Vss and Vdd is expressed as Vss>VDD, which is reverse to the relationship shown in FIG. 3 (Embodiment 1). An output voltage from the capacitor C has a high initial value, which is lowered by integration. When the fourth and fifth MOS transistors T4 and T5 are turned ON, a low voltage is applied to the gates thereof. As stated above, although voltages and connecting relations are partially different in the case of using the p-channel MOS transistors from the case of using the n-channel MOS transistors, the structure is substantially the same and the basic operation is the same, so that the structure and operation are only shown by FIGS. 14 to 22 and further description thereof will be omitted.

Figure 12:
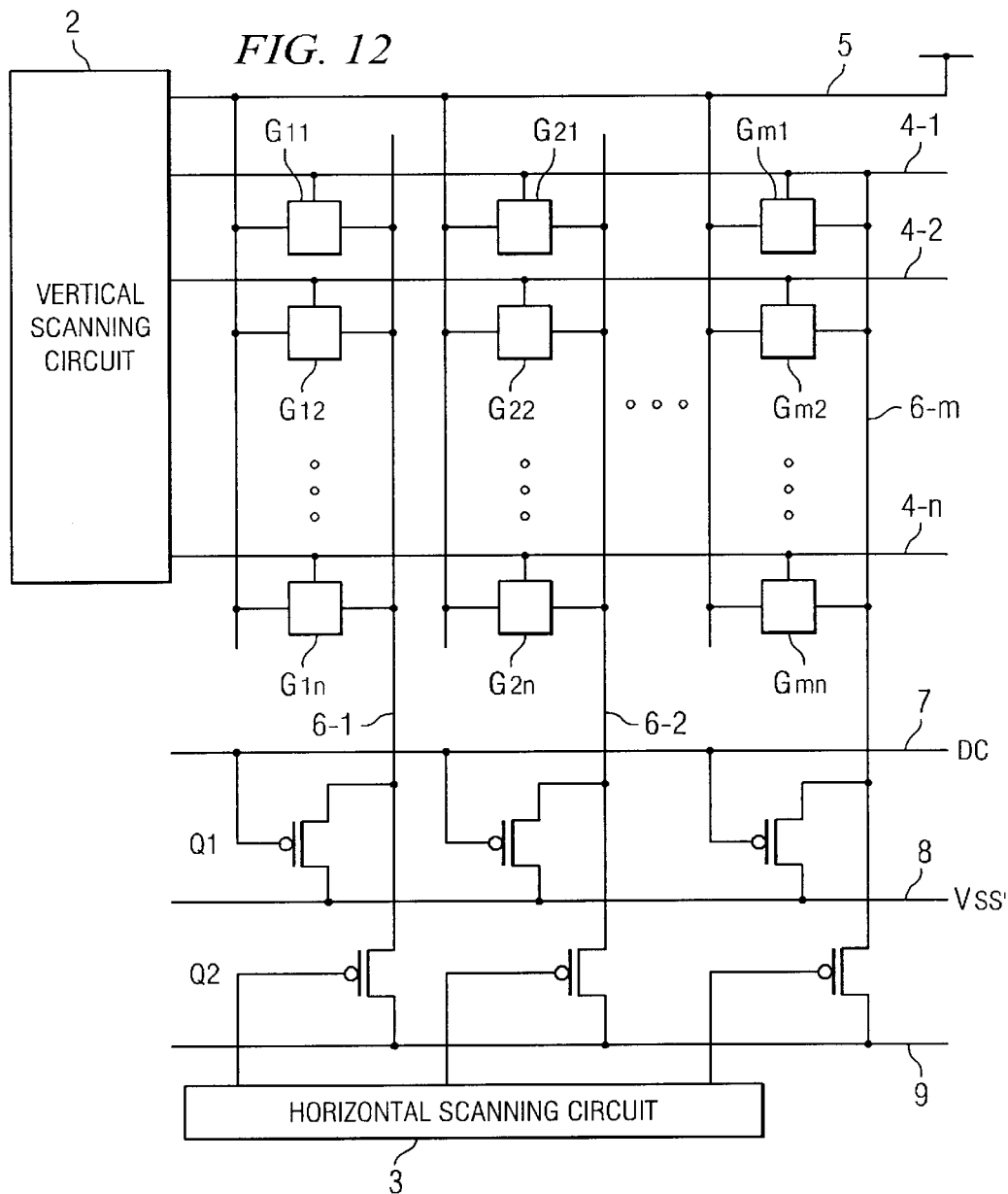
FIG. 12 is a block circuit diagram for illustrating the entire structure of a two-dimensional solid-state image pickup device according to the present invention in the case where an active element in each pixel is composed of a p-channel MOS transistor.

FIG. 12 is a block circuit diagram for illustrating the entire structure of a solid-state image pickup device comprising pixels according to the tenth to eighteenth embodiments. FIG. 13 shows the portion of a voltage amplifier circuit extracted from the image pickup device shown in FIG. 12. The description of the common components shown in FIGS. 12 and 1 will be omitted by providing the same reference numerals. As shown in FIG. 12, p-channel MOS transistors Q1 and Q2 are connected to each of the output signal lines 6-1 to 6-m which are arranged in rows. The MOS transistor Q1 has the gate connected to the direct-current voltage line 7, the drain connected to the output signal line 6-1, and the source connected to the line 8 at the direct-current voltage VSS'. On the other hand, the MOS transistor Q2 has the drain connected to the output signal line 6-1, the source connected to the final signal line 9, and the gate connected to the horizontal scanning circuit 3. The transistor Q1 and the p-channel third MOS transistor T3 in each of the pixels constitute a source-follower amplifier circuit as shown in FIG. 13(a).

In this case, the MOS transistor Q1 serves as a load resistor to the third MOS transistor T3. Consequently, the relationship between a direct-current voltage VSS' connected to the source of the transistor Q1 and a direct-current voltage VDD' connected to the source of the third MOS transistor T3 is expressed as VDD'<VSS'. The direct-current voltage VDD' is, e.g., the ground voltage (grounding). The transistor Q1 has the drain connected to a transistor T3 and the gate to which a direct-current voltage is applied. The p-channel MOS transistor Q2 is controlled by the horizontal scanning circuit 3 and leads out an output from the amplifier circuit onto the final output line 9. If the circuit shown in FIG. 13(a) is depicted more precisely in conjunction with the fifth MOS transistor T5, the circuit shown in FIG. 13(b) is obtained. Specifically, a fifth MOS transistor is interposed between the MOS transistor Q1 and the third MOS transistor T3. The fifth MOS transistor T5 is for selecting among columns, while the MOS transistor Q2 is for selecting among rows.

As stated previously, since integration is performed in the capacitor, the variable component and noise component of light from the light source can be removed. In addition, amplification for increasing the magnitude of a signal as desired provides a high-quality image pickup signal with an improved S/N ratio, while facilitating the processing of the signal in the subsequent circuit. On the other hand, logarithmic conversion of a photoelectric current provides an enlarged dynamic range. Moreover, since each of the pixels is provided with the photoelectric converting means, the capacitor, the amplifier, and the lead-out means, a signal can be read more stably and more accurately. Furthermore, the active elements composed of the MOS transistors can be formed on a single chip in conjunction with peripheral processing circuits (including an A/D converter, a digital system processor, and a memory), which contributes to the implementation of, for example, a one-chip camera.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. An image pickup device having a plurality of pixels, each of said pixels comprising:

a photoelectric converting element to generate an output current proportional to incident light;

a logarithmic converting device connected to a first electrode of said photoelectric converting element for changing said output current into a converted voltage proportional to the logarithm of said output current;

an integrating circuit connected to said logarithmic converting device for receiving said converted voltage and for generating a second voltage proportional to the integral over time of said converted voltage;

an amplifying circuit connected to said integrating circuit for amplifying generating an amplified signal in accordance with said second voltage from said integrating circuit; and a lead-out path for leading out said amplified signal onto an output signal line, wherein the integrating circuit is provided between the logarithmic converting device and the amplifying circuit.

2. An image pickup device in accordance with claim 1, wherein said amplifying circuit includes:

said integrating circuit includes a transistor of which a gate electrode is connected to said logarithmic converting device and a capacitor connected to said transistor, and an amplifier transistor having a first electrode, a second electrode, and a control electrode, said integrating circuit being connected to said control electrode, said second electrode being connected to said output signal line.

3. An image pickup device in accordance with claim 2, wherein said image pickup device includes a plurality of output signal lines and at least a portion of said plurality of pixels are connected to each of said output signal lines, each output signal line having a load resistor connected between said output signal line and a voltage source line.

4. An image pickup device in accordance with claim 3, wherein a number of said load resistors is smaller than a number of said plurality of pixels.

5. An image pickup device having a plurality of pixels each of said pixels comprising:

a photoelectric converting element to generate an output current proportional to incident light;

a logarithmic converting device connected to a first electrode of said photoelectric converting element for changing said output current into a converted voltage proportional to the logarithm of said output current;

an integrating circuit connected to said logarithmic converting device for receiving said converted voltage and for generating a second voltage proportional to the integral over time of said converted voltage;

an amplifying circuit connected to said integrating circuit for generating an amplified signal in accordance with said second voltage from said integrating circuit, said amplifying circuit including an amplifier transistor having a first electrode, a second electrode, and a control electrode, said integrating circuit being connected to said control electrode, said second electrode being connected to said output signal line; and a lead-out path for leading out said amplified voltage onto an output signal line, wherein said image pickup device includes a plurality of output signal lines and at least a portion of said plurality of pixels are connected to each of said output signal lines, each output signal line having a load resistor connected between said output signal line and a voltage source line, wherein each of said load resistors is a resistor transistor having a first electrode connected to a respective one of said output signal lines, a second electrode for connection to a first direct-current voltage via said voltage source line, and a control electrode for connection to a direct-current voltage source.

6. An image pickup device according to claim 5, wherein said amplifier transistor is an n-channel MOS transistor and said resistor transistor is an n-channel MOS transistor.

7. An image pickup device according to claim 5, wherein said amplifier transistor is a p-channel MOS transistor and said resistor transistor is an p-channel MOS transistor.

8. An image pickup device in accordance with claim 1, wherein said integrating circuit includes:

a transistor having a first electrode, a second electrode, and a control electrode, said control electrode being connected to said logarithmic converting device to receive said converted voltage; and a capacitor having one terminal connected to said second electrode of said transistor to generate said second voltage based on an output of said transistor.

9. An image pickup device in accordance with claim 8, wherein said first electrode of said transistor is connected to said photoelectric converting element.

10. An image pickup device in accordance with claim 9, wherein said integrating circuit further comprises a switch connected between said transistor and said capacitor for selectably communicating an output from said transistor to said capacitor so that accumulation of a charge based on said second voltage in said capacitor may be controlled thereby.

11. An image pickup device in accordance with claim 8, further comprising a reset device for resetting said integrating circuit so that integration over time of said converted voltage may be reinitialized.

12. An image pickup device in accordance with claim 11, wherein said integrating circuit further comprises a switch connected between said transistor and said capacitor for selectably communicating an output from said transistor to said capacitor so that accumulation of said second voltage in said capacitor may be controlled thereby.

13. An image pickup device in accordance with claim 12, wherein said transistor has a pn junction capacitance and is adapted to accumulate a charge based on an output of said logarithmic converting device when said switch is in an open position.

14. An image pickup device in accordance with claim 8, further comprising a second transistor connected between said transistor and said capacitor, said second transistor having a first electrode connected to said capacitor, a second electrode for connection to a direct-current voltage source, and said second transistor being adapted for operating as a resistor when constantly in an ON state as a result of a direct-current voltage applied to a gate electrode thereof.

15. An image pickup device in accordance with claim 1, wherein said integrating circuit includes:

a first transistor having a first electrode, a second electrode, and a control electrode, said control electrode being connected to said logarithmic converting device to receive said converted voltage;

a first capacitor, one terminal of said first capacitor being connected to said second electrode of said first transistor to receive an output from said first transistor;

a second capacitor, one terminal of said second capacitor being connected to said second electrode of said first transistor via a switch so that said first capacitor generates said second voltage based on an output of said transistor when said switch is in an open position and said first capacitor and said second capacitor together generate said second voltage when said switch is in a closed position.

16. An image pickup device comprising:

a plurality of pixels for detecting incident light and for generating a signal in response thereto; and a read-out circuit for selectively reading out said signal from any one of said plurality of pixels;

each of said pixels including:

a photosensor which generates an output based on light incident thereon;

an integrating circuit connected to a first electrode of said photosensor for receiving said output from said photosensor and for generating a second signal proportional to the integral over time of said output from said photosensor;

an amplifying circuit connected to said integrating circuit for generating an amplified signal in accordance with said second signal; and a lead-out path for leading out said amplified second signal onto an output signal line, wherein said read-out circuit includes a plurality of output signal lines and at least a portion of said plurality of pixels are connected to each of said output signal lines each output signal line having a load resistor connected between said output signal line and a voltage source line, and wherein each of said load resistors is a resistor transistor having a first electrode connected to a respective one of said output signal lines, a second electrode connected to said voltage source line, and a control electrode for connection to a direct-current voltage source.

17. An image pickup device in accordance with claim 16, wherein said amplifying circuit includes:

an amplifier transistor having a first electrode, a second electrode, and a control electrode, said integrating circuit being connected to said control electrode, said second electrode being connected to said output signal line.

18. An image pickup device in accordance with claim 16, wherein said a photosensor includes:
- a photodiode which generates a photocurrent proportional to light incident thereon; and
- a logarithmic converting device connected to said photodiode for changing said photocurrent into said output, said output being a converted voltage that is proportional to the logarithm of said photocurrent.

19. An image pickup device in accordance with claim 18, wherein said integrating circuit includes:
- a MOS transistor having a gate connected to said photosensor; and
- a first capacitor having one terminal connected to a first electrode of said MOS transistor, said capacitor accumulating a charge proportional to the integral over time of said converted voltage.

20. An image pickup device in accordance with claim 19, wherein said second electrode of said MOS transistor is connected to said photodiode.

21. An image pickup device in accordance with claim 16, further comprising a first switching device connected between said photosensor and said integrating circuit for selectably communicating said output signal to said integrating circuit.

22. An image pickup device in accordance with claim 21, further comprising a second switching device connected between said amplifying circuit and said output signal line for selectably communicating said amplified second signal out onto said output signal line.

23. An image pickup device in accordance with claim 16, further comprising a an integrating circuit resetting device for selectably resetting a voltage in said integrating circuit.

24. An image pickup device in accordance with claim 16, wherein said integrating circuit includes:
- a MOS transistor having a gate connected to said photosensor;
- a first capacitor having one terminal connected to a first electrode of said MOS transistor;
- a second capacitor having one terminal of said second capacitor being connected to said amplifying circuit;
- a capacitor switching device disposed between said first capacitor and said second capacitor for switchably coupling one terminal of said first capacitor with said one terminal of said second capacitor so that both of said first and second capacitors can integrate an output from said first electrode of said MOS transistor when said capacitor switching device is in a closed position and only said first capacitor can integrate said output from said first electrode of said MOS transistor when said capacitor switching device is in a an open position, said one terminal of said second capacitor being connected to said amplifying circuit even when said capacitor switching device is in a an open position.

25. An image pickup device according to claim 17, wherein said amplifier transistor is an n-channel MOS transistor and said resistor transistor is an n-channel MOS transistor.

26. An image pickup device according to claim 17, wherein said amplifier transistor is a p-channel MOS transistor and said resistor transistor is an p-channel MOS transistor.

27. An image pickup device comprising:
- a plurality of pixels for detecting incident light and for generating a signal in response thereto; and
- a read-out circuit for selectively reading out said signal from any one of said plurality of pixels;

each of said pixels including:
- a photodiode which generates a photocurrent proportional to light incident thereon; and
- a logarithmic converting device connected to a first electrode of said photodiode for changing said photocurrent into an output voltage that is proportional to the logarithm of said photocurrent;
- a transistor having a control electrode connected to said logarithmic converting device to receive said output voltage and to generate a signal based thereon; and
- a capacitor having one terminal connected to a first electrode of said transistor, said capacitor accumulating a second signal proportional to the integral over time of said signal from said transistor;
- a first switching device connected between said first electrode of said transistor and said capacitor for selectably communicating said signal to said capacitor;
- an amplifying circuit connected to said one terminal of said capacitor for amplifying said second signal received from said capacitor;
- a lead-out path for leading out said amplified signal onto an output signal line; and
- a capacitor resetting device connected to said one terminal of said capacitor for selectably resetting a voltage on said capacitor.

28. An image pickup device in accordance with claim 27, wherein said read-out circuit includes a plurality of output signal lines, each output signal line having a line-select switch for selecting said line from said plurality of lines to read out a signal, at least a portion of said plurality of pixels being connected to each of said output signal lines, each output signal line having a load resistor connected between said output signal line and a voltage line.

29. An image pickup device in accordance with claim 28, wherein each of said load resistors is a load MOS transistor being adapted to operate as a resistor across a source and drain thereof when a constant gate bias is applied, either of said drain and source of said load MOS transistor being connected to said output signal line and either of said sorce and drain of said load MOS transistor being connected to said voltage line.

30. An image pickup device in accordance with claim 29, wherein said load MOS transistor is an n channel MOS transistor and said line-select switch is an n channel MOS transistor.

31. An image pickup device in accordance with claim 29, wherein said load MOS transistor is a p channel MOS transistor and said line-select switch is a p channel MOS transistor.

32. An image pickup device in accordance with claim 27, wherein a second electrode of said transistor is connected to a second electrode of said photodiode.

33. An image pickup device in accordance with claim 32, wherein said amplifying circuit includes:
- an amplifier transistor having a first electrode, a second electrode, and a control electrode, said control electrode being connected to said one terminal of said capacitor, said second electrode being connected to said output signal line.

34. An image pickup device having a plurality of pixels arranged to form a matrix, each of said pixels comprising:
- a photodiode;
- a first MOS transistor having a first electrode and a gate electrode each connected to a first electrode of said photodiode, said first MOS transistor operating in a subthreshold region;

a second MOS transistor having a gate electrode connected to said gate electrode of said first MOS transistor and a first electrode for connection to a direct-current voltage;

a capacitor having a first terminal connected to a second electrode of said second MOS transistor and a second terminal for connection to a direct-current voltage, said capacitor for integrating a signal received from said second MOS transistor based on photoelectric charges generated in said photodiode;

a third MOS transistor having a gate electrode connected to said first terminal of said capacitor and a first electrode for connection to a direct-current voltage, said third MOS transistor operating as an amplifier;

a fourth MOS transistor having a first electrode connected to said first terminal of said capacitor and a second electrode for connection to a direct-current voltage, said fourth MOS transistor being adapted to be turned ON in response to a reset signal inputted to a gate electrode thereof to reset said capacitor to an initial state; and a fifth MOS transistor for selecting a read operation having a first electrode connected to a second electrode of said third MOS transistor, a second electrode connected to an output signal line, and a gate electrode connected to a column select line.

35. An image pick up device in accordance with claim 34, wherein said first electrode of said second MOS transistor is connected to said first electrode of said photodiode.

* * * * *